C. G. SWEBILIUS & H. T. R. HANITZ.
REPEATING FIREARM.
APPLICATION FILED OCT. 25, 1913.

1,103,228.

Patented July 14, 1914.
6 SHEETS—SHEET 1.

C. G. SWEBILIUS & H. T. R. HANITZ.
REPEATING FIREARM.
APPLICATION FILED OCT. 25, 1913.

1,103,228.

Patented July 14, 1914.
6 SHEETS—SHEET 3.

C. G. SWEBILIUS & H. T. R. HANITZ.
REPEATING FIREARM.
APPLICATION FILED OCT. 25, 1913.

1,103,228.

Patented July 14, 1914.
6 SHEETS—SHEET 4.

UNITED STATES PATENT OFFICE.

CARL GUSTAF SWEBILIUS AND HANS T. R. HANITZ, OF NEW HAVEN, CONNECTICUT, ASSIGNORS TO THE MARLIN FIREARMS COMPANY, OF NEW HAVEN, CONNECTICUT, A CORPORATION OF CONNECTICUT.

REPEATING FIREARM.

1,103,228. Specification of Letters Patent. Patented July 14, 1914.

Application filed October 25, 1913. Serial No. 797,201.

*To all whom it may concern:*

Be it known that we, CARL GUSTAF SWEBILIUS, a citizen of the United States, residing at New Haven, New Haven county, State of Connecticut, and HANS T. R. HANITZ, a subject of the Emperor of Germany, residing at New Haven, New Haven county, State of Connecticut, have invented certain new and useful Improvements in Repeating Firearms, of which the following is a full, clear, and exact description.

Our invention relates to improvements in repeating fire arms of the so-called magazine type and the object, broadly, is to provide therein certain new and useful improvements which aim toward simplicity and durability of construction.

In the accompanying drawings, Figs. 2, 3 and 4 are, in the main, similar views showing the parts in different positions. Fig. 12$^a$ is a view of the opposite side of the parts shown in Fig. 12.

We have shown in the above drawings, our invention in a preferred form which may be modified in detail and arrangement in various ways. The principal parts comprise the barrel, receiver, guard, breech block, locking bolt, lock-up slide, bolt operating cam, action rod, safety latch, hammer, sear, trigger and safety mechanism.

1 is a receiver.
2 is a barrel.
3 is a stock.
4 is a slide action rod positioned and guided at the under side of the barrel, and entering the front end of the receiver 1.

5 is a combined breech block and locking bolt.

6 is what we term a "lock-up slide" associated with said locking bolt and operated by the action rod so as to impart a reciprocal movement to the combined locking bolt and breech block to insert and extract the cartridge, and so as to tilt the said part into locking position when the gun is ready to be fired.

Figure 2:
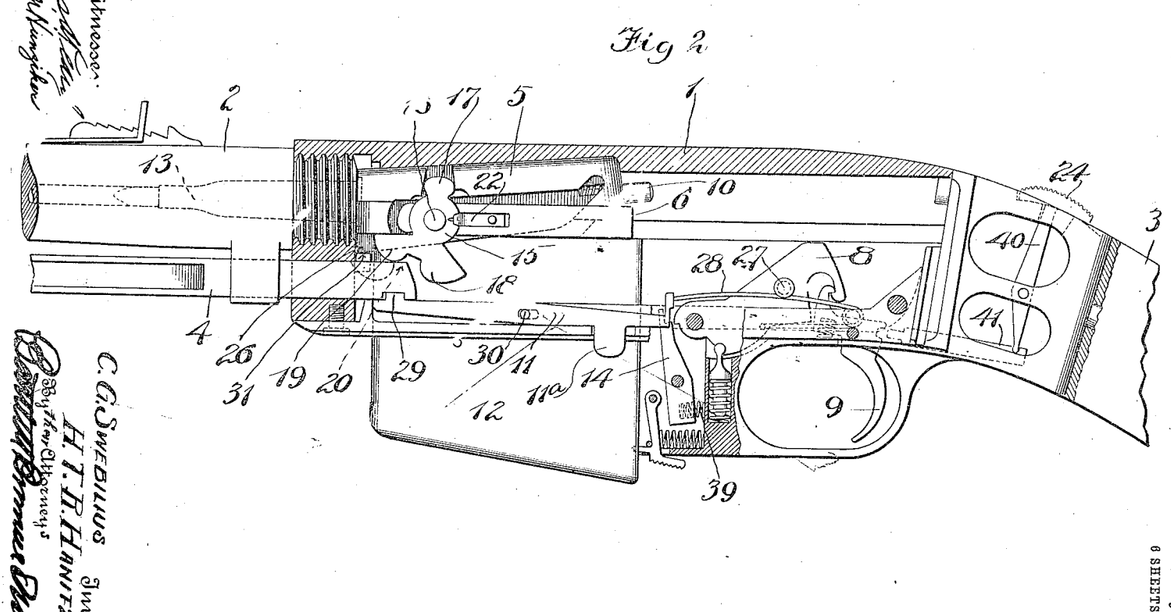

7 is a lock-up shoulder in the top wall of the receiver against which the combined breech block and locking bolt engages when the gun is ready to be fired, as in Fig. 2.

8 is a concealed swinging hammer having a hooked latching end.

9 is a trigger having a coöperating latching end arranged to engage the latching end of the hammer when the breech block is retracted and to release the hammer when the trigger is pulled. The hammer and the trigger are provided with the usual springs as shown.

10 is a firing pin spring pressed as usual and carried by the breech block.

11 is a safety latch.

Figures 11, 12, 13, 14, 15, 16, 17, 18:
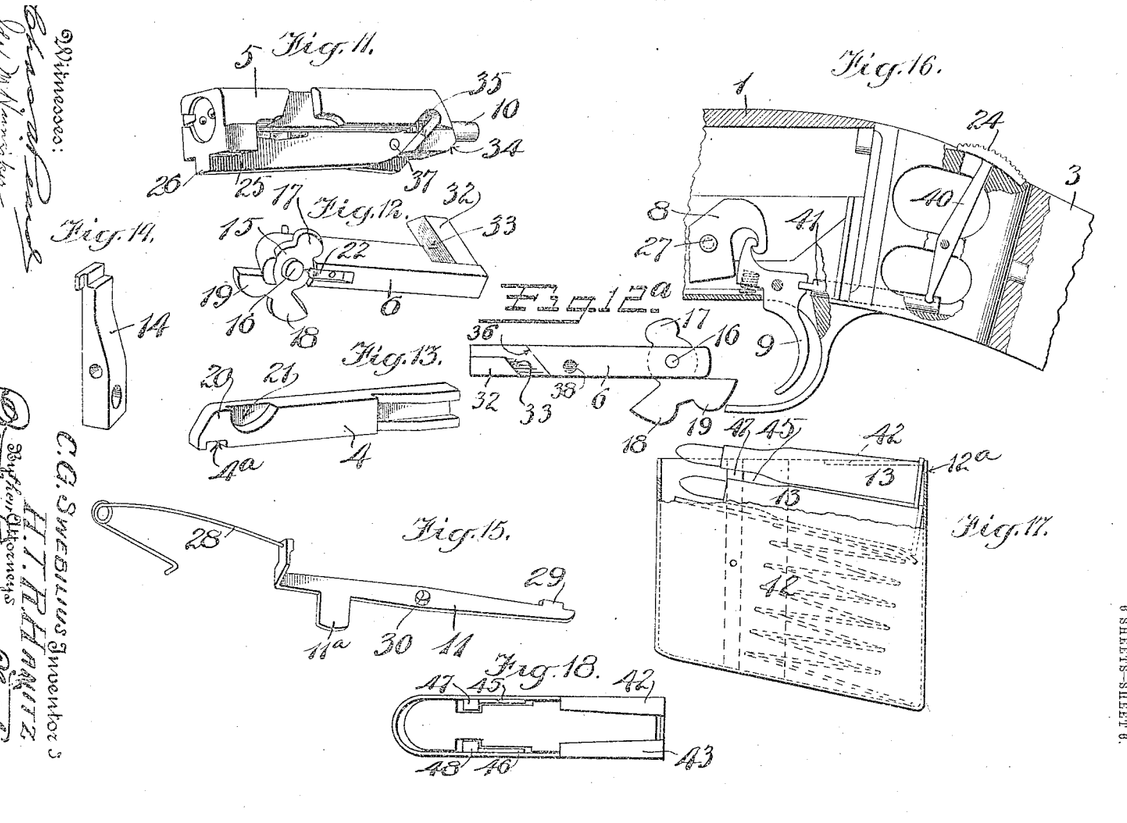
Fig. 11 is a perspective view of the combined breech block and locking bolt.
Fig. 12 is a perspective view of a lock-up slide.
Figs. 13, 14 and 15 are perspective views of details.
Fig. 16 is a sectional view illustrating certain details.
Fig. 17 is a side elevation partly in section of the box magazine.
Fig. 18 is a plan view of the box magazine with no cartridges therein.

12 is a box magazine for cartridges 13—13, which are arranged to stand in said magazine as shown in Fig. 17.

Figure 4:
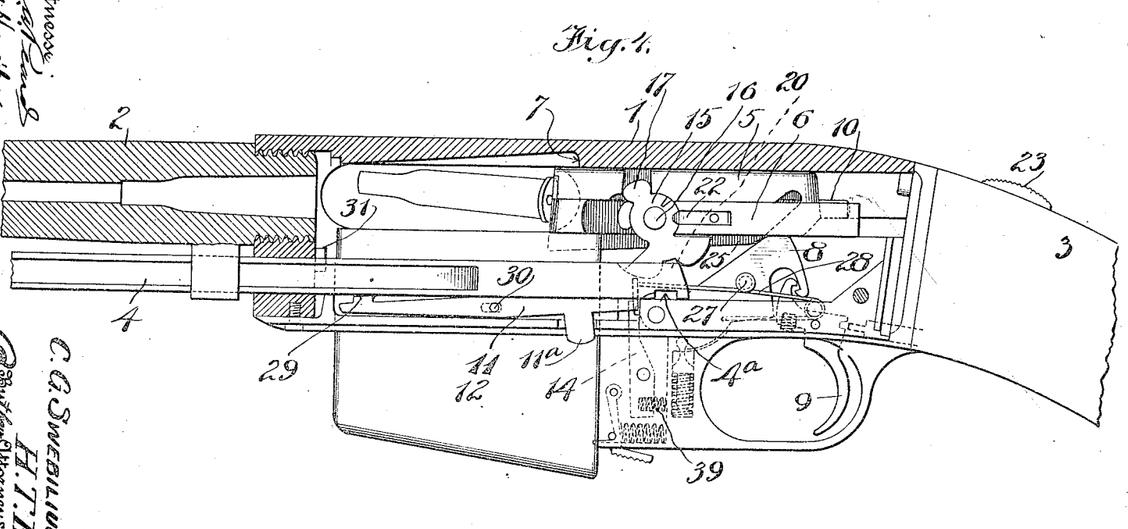

14 is a sear having a locking shoulder and arranged to coact with a shoulder on the hammer when the parts stand in the position shown in Fig. 4.

15 is a cam for the lock-up slide 6 and the combined breech block and locking bolt 5. The lock-up slide 6 lies in a recess in one side of the breech block 5, its outer edge being guided in a horizontal groove in the side wall of the receiver. The cam 15 is pivotally mounted at 16 in the side of the lock-up slide and comprises an upwardly projecting shoulder 17 lying in a vertical notch in the side of the breech block as shown in several views. The lower part of the cam is formed with two arms 18—19 which, in turn, provide a recess between them to receive a shoulder 20 at the rear end of the action rod located just in rear of the side notch 21 therein. (See Fig. 13).

22 is a spring detent arranged to engage in a notch in slide 6 to hold the cam 15 in the position shown in Fig. 3 should the action rod be pulled forward out of the receiver, whereby said cam will remain in the proper position to receive said rod when it is reinserted.

24 is an exposed safety device which is accessible on the forward upper side of the stock and by the operation of which the trigger may be locked to prevent the accidental discharge of the gun. This also acts as an indicator and will later be described. The breech block is provided with any suitable form of cartridge extracting and ejecting mechanism and likewise any suitable means for engaging the uppermost cartridge in the box magazine and forcing it into the chamber of the barrel, it being understood that the box magazine is provided with the usual follower spring to cause the cartridges to rise successively into position to be engaged by the breech block and advanced into the barrel.

Figure 1:
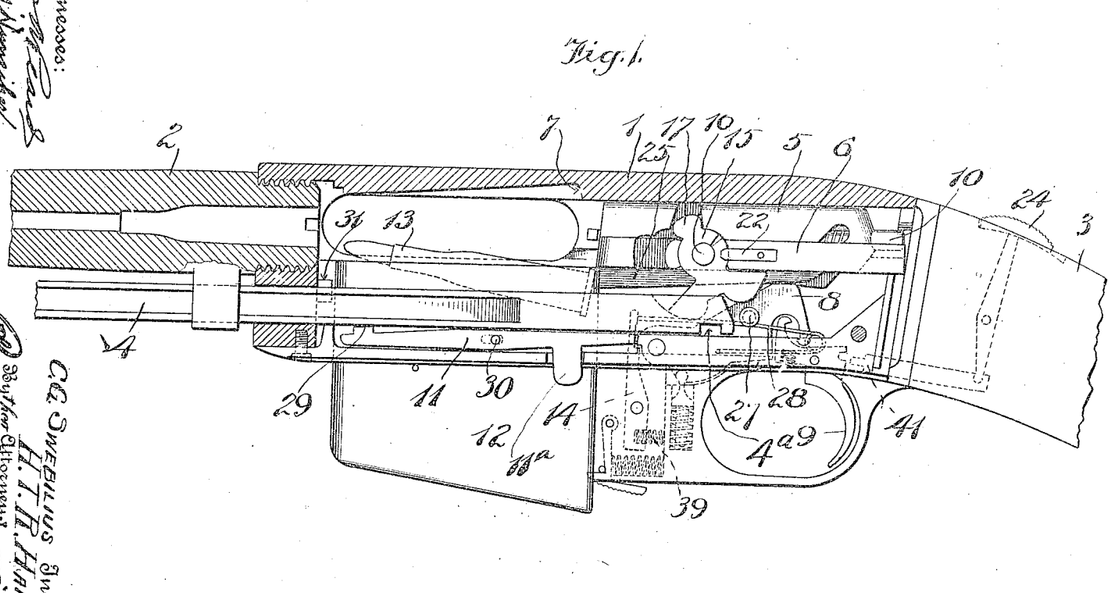
Figure 1 is, in the main, a central longitudinal section of the breech portion of the fire arm, showing the various operating parts in side elevation.
Figure 5:
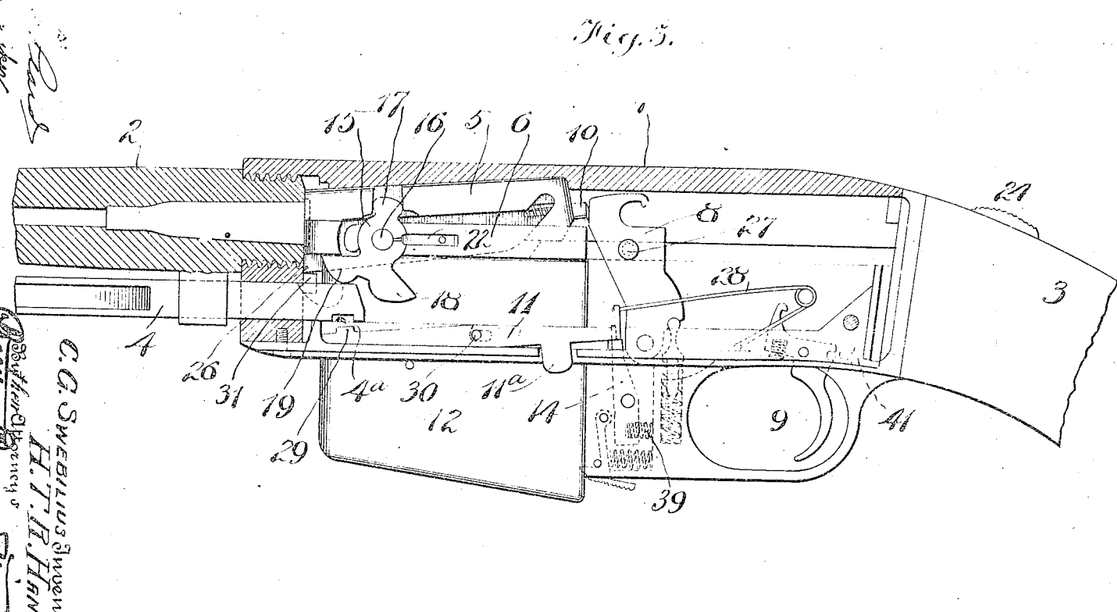
Fig. 5 is a horizontal longitudinal section through the breech and box magazine.

With this general description of parts, we may now describe briefly how the mechanism operates and also describe more in detail specific features of construction incidental to the various main features and which contribute to the operation of such features. Fig. 1 shows the breech block fully retracted, engaging a cartridge ready to push it into the barrel. Fig. 2 shows the breech block fully advanced and locked up, the gun being ready to be fired. Fig. 3 shows the position of the parts when the gun has been fired, the empty shell being shown in the barrel. Fig. 4 shows the breech block again retracted with the empty shell being discharged. Starting again with Fig. 1: In this position the breech block has been forced into its extreme rearward position by the rearward movement of the action rod 4 against cam 15; the rearward movement of the breech block has overcocked the hammer 8. There is an inclined rib 25 on the under side of the said breech block, which rib 25 inclines upwardly and is shown in Fig. 1 as engaging a cartridge with the shoulder 26 formed thereby, (Fig. 11). This shoulder is also useful as a camming shoulder to assist in opening the breech block and extracting a discharge shell as hereinafter described. When the parts are in the position shown in Fig. 1, it will be seen that a stud 27 carried by the hammer 8 is engaging with and tensioning a spring 28 having one end supported by the receiver and having its other end fixed in the rear end of the safety latch 11, and which, when the hammer is in the forward position, tends to lift the rear end as shown in Fig. 3. When, however, the hammer is cocked (see Fig. 2) the stud 27 depresses the spring 28 and in turn puts a yielding downward pressure on the rear end of the said safety latch positioning its nose 29 in the notch 4$^a$ in the action rod. The forward movement of the action rod 4 shifts the parts to the position indicated in Fig. 2. On this forward movement a cartridge is picked up and forced into the chamber; the rib 25 passes beyond the hammer 8 and the latter ascends first to the position shown in Fig. 4 where it is engaged by the hammer sear 14 and held thereby until the gun is fully locked. When the action rod has pulled the breech block into its forward position, the said rod acts on the cam 15 and pulls the lock-up slide 6 ahead. This forward movement of the lock-up slide relatively to the breech block 5 operates to tilt the breech block up into the locking position shown in Fig. 2. So also when the action rod has nearly reached the limit of its forward excursion, the nose 29 at the forward end of the safety latch 11 swings up under the influence of the spring 28 which is still depressed by the hammer 8. On swinging up, the nose 29 enters a notch 4$^a$ on the under side of the action rod, whereby the continued forward movement of the action rod pulls the safety latch 11 ahead slightly. The rear end of the safety latch 11 is offset and rests in rear of the offset upper end of sear 14 (see Figs. 5, 14 and 15), so that this forward sliding movement will move the sear to disengage the hub of the hammer and allow the latter to move slightly ahead from the position indicated in Fig. 4, to that indicated in Fig. 2, wherein the hooked end of the hammer will engage the hooked end of the trigger, the trigger then being the only means for holding the hammer against advancing. The gun is now ready to be fired. When the trigger is pulled, the hammer advances and strikes the firing pin 10, discharging the cartridge, whereupon the parts will assume the position shown in Fig. 3. In this figure, it will be seen that the spring 28 has been released by the hammer stud 27 and has assumed its normal position shown in Fig. 3, wherein the spring tends to lift the rear end of the safety latch 11 so as to free the nose 29 from the action rod, whereby the action rod may be retracted. Previously to this tilting movement and the advance of the hammer, it is obvious that the action rod is held in its forward position shown in Fig. 2 by the pressure of the nose 29 of the safety latch 11 in the notch 4$^a$ of the rod 4. The safety latch is provided with a pivot stud 30 which moves in a short slot in the frame to permit the safety slide to have not only a tilting, but also a limited sliding movement.

Now returning to the parts as shown in Fig. 3: A rearward movement of the action rod 4 will engage the cam 15 and tilt it in a direction to move the lock-up slide 6 rearwardly relatively to the breech block. This movement causes the breech block to be tilted down into the horizontal position so as to become free from the lock-up shoulder 7 as will be more fully explained. On this tilting down movement the breech block fulcrums on the forward end of the receiver, the point of the shoulder 26 constituting a fulcrum of a long lever so powerful as to readily extract the discharged shell, even though the latter may stick in the chamber of the barrel. It will also be observed that directly below the shoulder 26 or fulcrum point, there is a rearwardly extending shoulder 31 on the interior of the receiver 1, which operates as a ledge to support the forward end of the breech block and relieve any danger of the accumulation of gases above the breech block, blowing the forward end of the breech block downwardly.

Figures 5, 6, 7, 8, 9, 10:
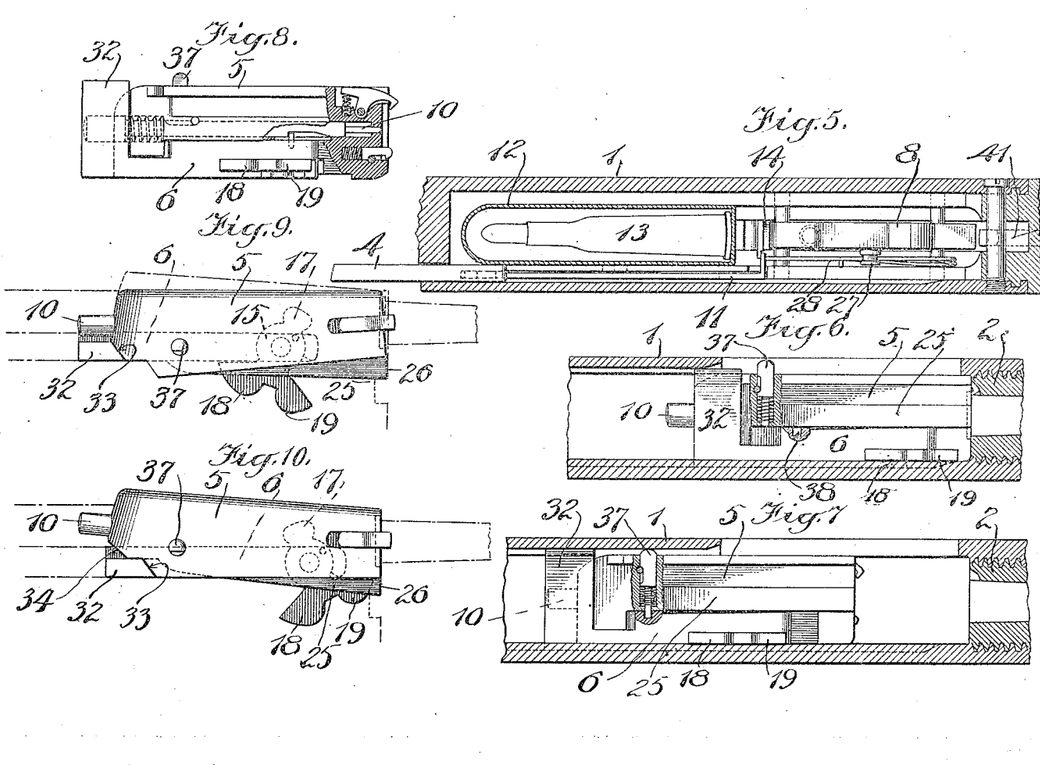
Figs. 6 and 7 are similar views showing other parts.
Figs. 8, 9 and 10 are different views of the combined breech block and locking bolt and associated parts.

The lock-up slide is associated with the breech block so as to impart the tilting movement thereto as follows. At the rear end of the lock-up slide is a lateral offset 32. On the forward side of this lateral offset 32 is provided an inclined wedge surface 33, this wedge surface being designed to engage a corresponding incline 34 on the rear under side of the breech block. Directly forward of the incline 34 is an oblique recess in the side of the breech block forming an inclined shoulder 35. 36 is an incline on the inner side of the lock-up slide 6 opposite to the wedge surface 33. This incline 36 is arranged to coact with the incline 35 on the breech block. As the lock-up slide moves forwardly relatively to the breech block, the incline 33 on the former, engaging the incline 34 on the latter, elevates the rear end of the breech block and forces it up to the locking position. When the lock-up slide moves rearwardly relatively to the breech block, the incline 36 engages the incline 35 on the breech block and pulls the rear end of the breech block down out of the locking position. Thus it is that the breech block is moved into and out of the locking position. It is desirable when the breech block is in the lower or unlocked position and is being reciprocated to and fro that said breech block and lock-up slide should be locked together so that the wedge incline 33 may not tend to lift the rear of the breech block against the top of the receiver and cause a binding action. Hence, we provide a bolt 37, the inner end of which is arranged to project into a bolt hole 38 in the side of the lock-up slide 6. This is best shown in Figs. 6 and 7. It will be noted that the bolt is normally spring pressed outward so that its locking nose will normally stand in the position shown in Fig. 6, wherein the outer end of the bolt stands in the ejector opening. When, however, the breech block is moved rearwardly, this bolt engages with the inner wall of the receiver as shown in Fig. 7 and is pressed in so that its locking end will enter the bolt hole 38, for when this occurs, the lock-up slide will be pulled back from the position indicated in Fig. 6 to that indicated in Fig. 7. When the action rod is moved ahead again, it is obvious that unless this bolt or an equivalent device is provided, the tendency of the inclined shoulder 33 would be to lift the rear end of the breech block and force it into binding engagement with the upper wall of the receiver, which, however, is now avoided. When the bolt 37 clears the wall of the receiver on such forward movement, the spring of the bolt frees the lock-up slide so that the wedge 33 thereof may move the breech-bolt upwardly against the shoulder 7. On the rear movement of the breech block incidental to the withdrawing of the empty cartridge shell, the said shell is ejected in the usual manner and the hammer is recocked as before, and is again engaged by the hammer sear 14 which is moved to the hammer engaging position by a spring 39. The trigger safety and indicator 24 has a lever 40 pivoted intermediate its ends, the lower end engaging in a bolt 41. The forward end of the bolt 41 is arranged to engage a notch in the rear end of the trigger when the trigger stands in the position shown in Figs. 2, 4 and 16, or in the position in which the hammer is cocked (Fig. 2) thereby locking the trigger (see Fig. 16) until the indicator is shifted to move bolt 41. When, however, the hammer has descended to the position shown in Fig. 3, the trigger will tilt down slightly so that the notch stands just below the end of the bolt 41, and in a position where the adjacent end of the trigger will block any substantial locking movement of bolt 41. Hence, the device 24 not only constitutes a trigger safety but also an indicator to show whether the hammer is down and whether it is safe to attempt to pull the trigger. If the trigger safety 24 cannot be freely moved, it shows that the hammer is not cocked, and that there would be no danger in pulling the trigger for any purpose.

It is obvious that under certain conditions it might be desirable to disengage the safety latch 11 from the rod, for example, for the purpose of permitting a cartridge to be withdrawn from the chamber of the barrel without allowing the hammer to descend. In other words, to unload the gun without firing it. To that end we provide an extension 11$^a$ on the lower side of the latch 11 which projects through a somewhat elongated slot in the lower part of the receiver, as seen in Figs. 1 to 4. This slot is sufficiently long to permit the latch 11 to freely partake of its horizontal movement before described. Assuming the gun is loaded and the parts are in the position indicated in Fig. 2, it is obvious that without the provision of this manual release for the lever 11, it would be necessary to release the hammer 8 and allow it to descend and spring forward, thus discharging the cartridge 13. If it is the desire of the user to remove the cartridge 13 without permitting the hammer 8 to descend, he may merely press up on the extension 11ᵃ, thus freeing the nose 29 from the action rod 4 by withdrawing it from the notch 4ᵃ. This permits the action rod to be moved back to unlock the breech block and move the latter backward in the same manner as is observed in withdrawing the empty shell. This backward movement withdraws the loaded cartridge 13, permitting it to be ejected through the side opening the same as an empty shell. Obviously, in the unloading of the gun, the magazine 12 would naturally first be removed so that another cartridge would not be fed into place. This means for releasing the action rod may be also employed when it is desired to withdraw the action rod 4 from the receiver in the event it is desired to unscrew the barrel 2 from the receiver; for example, as described in United States Letters Patent No. 1,083,708 of January 6, 1914, which relates to a "take-down" gun in which the barrel 2 is removable from the receiver 1 by a relative rotation of the parts.

It will be observed that the back of the box magazine 12 has a notch 12ᵃ which furnishes a clearance for the rib 25 on the under side of the breech block so that the forward end of said rib, namely, the nose 26, may readily pass through to engage the uppermost cartridge 13 in the act of loading the gun.

What we claim is:

1. In a repeating firearm, a receiver, a vertically and longitudinally movable breech-block, a longitudinally movable lock-up slide guided on both sides of the receiver and adapted to force said breech-block either into or out of engagement with the lock-up shoulder of the receiver, a reciprocating action rod, and a breech-block operating cam adapted to convey the movement of the action rod to the breech-block and the lock-up slide.

2. In a repeating firearm, a receiver, a vertically and longitudinally movable breech-block, a longitudinally movable lock-up slide guided on both sides of the receiver and adapted to force said breech-block either into or out of engagement with the lock-up shoulder of the receiver, a reciprocating action rod, and a breech-block operating cam adapted to convey the movement of the action rod to the breech-block and lock-up slide, carried by said lock-up slide.

3. In a repeating firearm, a receiver, a vertically and longitudinally movable breech-block, a longitudinally movable lock-up slide, a breech-block operating cam, and a locking means carried by the breech-block adapted to rigidly lock breech-block and lock-up slide together when the breech-block is out of engagement with the lock-up shoulder in the receiver and starts on its rearward travel.

4. In a repeating firearm, a receiver, a longitudinally movable tilting breech-block, a longitudinally movable lock-up slide, a breech-block operating cam, and a reciprocating action-rod adapted to engage with the cam for either opening or closing the gun and having a limited free movement independently of said cam to securely lock the latter against movement while the breech is locked.

5. In a repeating firearm, a receiver, action mechanism therein including a breech-block arranged for both longitudinal and tilting movement, a lock-up slide associated therewith and arranged for longitudinal movement only relatively to the receiver and relatively to the breech-block, a reciprocating action rod, with operative means of connection between the same and said slide and breech-block, a spring-pressed hammer, a spring-pressed trigger, a spring-pressed sear, and a spring-pressed safety latch coöperating with said sear and also with said action rod.

6. In a repeating firearm, a receiver, action mechanism therein including a breech-block arranged for both longitudinal and tilting movement, a lock-up slide associated therewith and arranged for longitudinal movement only relatively to the receiver and relatively to the breech-block, a spring-pressed hammer, a spring-pressed trigger, a spring-pressed sear, and a spring-pressed safety latch coöperating with said sear and also with said action rod, with means for manually disengaging said safety latch from said rod at will.

7. In a repeating firearm, a receiver, action mechanism therein, including a reciprocating action rod, a hammer, a sear for said hammer, a safety latch having an intermediate fulcrum, said latch having a limited tilting and a limited longitudinal movement, one end of said latch engaging the sear to operate the latter, the other end engaging the action rod to be operated thereby and also to lock said rod, a spring normally acting to tilt said latch in a direction to disengage the rod, and means for moving said spring in a direction to reverse the tilting movement on the latch when the gun is cocked.

8. In a repeating firearm, a receiver, action mechanism therein including a breech-block and locking bolt, a reciprocating acton rod, a hammer, a sear, a safety latch, a fulcrum for the latter arranged intermediate its ends, said safety latch having both a limited sliding movement and a limited tilting movement, one end of said latch operatively engaging said sear, the other end operatively engaging said rod, and a spring normally tilting said latch in a direction to disengage it from said rod, said hammer coöperating with said spring when cocked to cause said spring to exert a tension on said latch in a direction to cause said latch to engage the rod, said latch coöperating with said rod when the latter is advanced and the gun is locked and the hammer is cocked to hold the rod against rearward movement until said hammer descends.

9. In a repeating firearm, a receiver, action mechanism therein including a breech-block and locking bolt, a reciprocating action rod, a hammer, a sear, a safety latch, a fulcrum for the latter arranged intermediate its ends, said safety latch having both a limited sliding movement and a limited tilting movement, one end of said latch operatively engaging said sear, the other end operatively engaging said rod, a spring normally tilting said latch in a direction to disengage it from said rod, said hammer coöperating with said spring when cocked to cause said spring to exert a tension on said latch in a direction to cause said latch to engage the rod, said latch coöperating with said rod when the latter is advanced and the gun is locked and the hammer is cocked to hold the rod against rearward movement until said hammer descends, and a manually operable means for disengaging said safety latch from said action rod while the hammer is cocked.

CARL GUSTAF SWEBILIUS.
HANS T. R. HANITZ.

Witnesses:
CLIFFORD B. WALKER,
JOHN F. MORAN.